United States Patent
Oakeson et al.

(10) Patent No.: US 7,249,166 B2
(45) Date of Patent: Jul. 24, 2007

(54) METHODS AND SYSTEMS FOR DETERMINING LOCAL DEVICE PROXIMITY

(75) Inventors: Kenneth L. Oakeson, Boise, ID (US); Shell S. Simpson, Boise, ID (US); Patrick O. Sandfort, Meridian, ID (US); Elliot Lee Klosterman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 673 days.

(21) Appl. No.: 09/967,052

(22) Filed: Sep. 28, 2001

(65) Prior Publication Data

US 2003/0065710 A1    Apr. 3, 2003

(51) Int. Cl.
G06F 15/16 (2006.01)
H04M 3/42 (2006.01)
(52) U.S. Cl. .............. 709/217; 455/414.1; 701/207
(58) Field of Classification Search .......... 709/202, 709/203, 218, 219, 217; 455/414.1–414.2, 455/456.1–456.3, 404; 342/386; 707/100; 345/737; 701/207
See application file for complete search history.

(56) References Cited

U.S. PATENT DOCUMENTS

| 6,115,754 | A  | * | 9/2000  | Landgren ................... 709/249 |
| 6,456,852 | B2 | * | 9/2002  | Bar et al. ................ 455/456.1 |
| 6,633,757 | B1 | * | 10/2003 | Hermann et al. ........ 455/414.1 |
| 6,697,018 | B2 | * | 2/2004  | Stewart ..................... 342/386 |
| 6,772,213 | B2 | * | 8/2004  | Glorikian ................... 709/228 |
| 6,782,253 | B1 | * | 8/2004  | Shteyn et al. ........... 455/414.1 |
| 6,816,735 | B1 | * | 11/2004 | Rayburn et al. ......... 455/456.4 |
| 2002/0055924 | A1 | * | 5/2002 | Liming ...................... 707/100 |
| 2002/0122055 | A1 | * | 9/2002 | Parupudi et al. ........... 345/737 |

* cited by examiner

*Primary Examiner*—Jungwon Chang

(57) ABSTRACT

Methods and systems enable devices to discover each other when the devices are in a common location. Unique identifiers (UIDs) are associated with one or more location and each UID uniquely identifies a location. Devices that are located in a particular location that has a UID can register to create an association between the device and the UID. In turn, this creates an association between the device and a location. Subsequently, when another device (e.g. a laptop computer or PDA) enters the location, the device can discover the UID of the location and then ascertain which other devices are associated with that location.

10 Claims, 4 Drawing Sheets

METHODS AND SYSTEMS FOR DETERMINING LOCAL DEVICE PROXIMITY

TECHNICAL FIELD

This invention relates to methods and systems for determining local device proximity.

BACKGROUND

As computing environments become more and more mobile, the need to be able to locate devices and services becomes more important. For example, consider an individual with a laptop computer whose job requires them to travel to various geographically-separated company locations. Perhaps in the morning they attend a meeting in Boise, Id., and, in the afternoon have another meeting scheduled in Vancouver, Wash. Assume now that at each of the meeting locations, there are various computing devices or peripherals that would be convenient for the user to use and access using their laptop computer. For example, there may be printers, plotters, facsimile machines (electronic fax machines or services) and the like that are location specific and convenient for the user to use. There may also be electronic equipment in the meeting rooms that would be convenient to use.

While there may be a number of devices that are available for use in each of the locations, the user will be unable to use them if they cannot discover the devices. Accordingly, this invention arose out of concerns associated with providing methods and systems that facilitate local device discovery.

SUMMARY

Methods and systems enable devices to discover each other when the devices are in a common location. Unique identifiers (UIDs) are associated with one or more location and each UID uniquely identifies a location. Devices that are located in a particular location that has a UID can register to create an association between the device and the UID. In turn, this creates an association between the device and a location. Subsequently, when another device (e.g. a laptop computer or PDA) enters the location, the device can discover the UID of the location and then ascertain which other devices are associated with that location.

BRIEF DESCRIPTION OF THE DRAWINGS

The same numbers are used throughout the drawings to reference like features and components.

DETAILED DESCRIPTION

Overview

The methods and systems described below enable devices to discover each other when the devices are in a common location. A convenient, flexible and adaptable approach utilizes unique identifiers (UIDs) that are associated with one or more location. Each UID uniquely identifies a location. Devices that are located in a particular location that has a UID can register to create an association between the device and the UID. In turn, this creates an association between the device and a location. Subsequently, when another device (e.g. a laptop computer or PDA) enters the location, the device can discover the UID of the location and then ascertain which other devices are associated with that location.

When a device leaves a location and enters a new location, it can simply acquire the UID of the new location to ascertain which other devices correspond to that location. The device can also register itself for the new location so that it can be discovered by other devices.

Exemplary Network System

Figure 1:
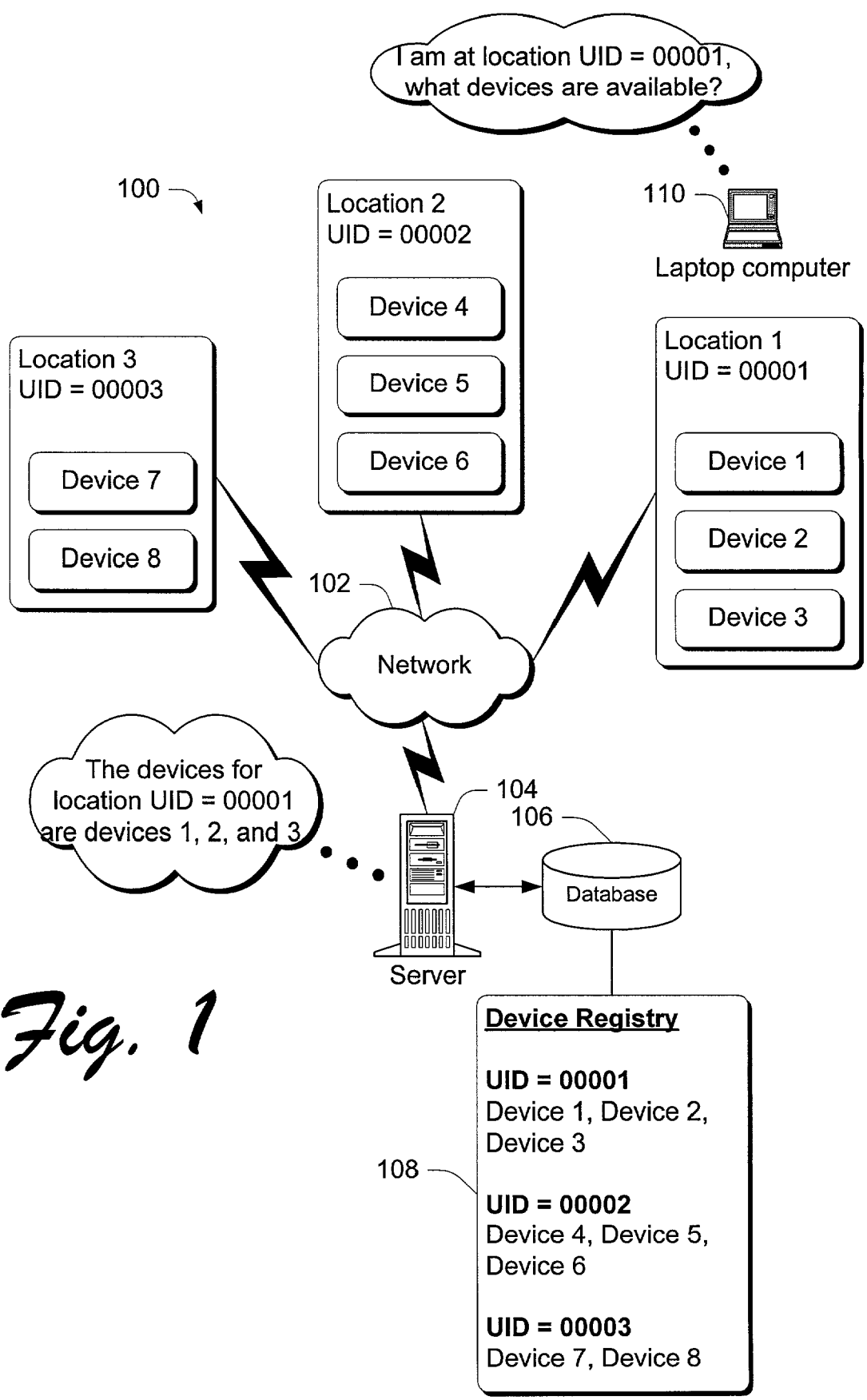
FIG. 1 is an illustration of an exemplary system in which one or more embodiments can be utilized.

FIG. 1 shows an exemplary system 100 that is configured to enable devices to register for their locations so that other devices can discover them. In this example, system 100 includes a network 102, one or more servers 104 and a database 106. Network 102 can comprise any suitable network, e.g. WANs, LANs, and the like. A number of different locations are shown and are designated "Location 1", "Location 2", and "Location 3". Each location includes a unique identifier, also referred to as a "UID". For example, for Location 1, the UID=00001; for Location 2, the UID=00002; and for Location 3, the UID=00003. Any number of locations can be provided. These locations may or may not be related in some sense. For example, the locations might be associated with a particular company (i.e. they might be company divisions or different meeting rooms at the same division). In this case, the locations might be considered as being related. Alternately, the locations might be associated with completely different entities. For example, one location might comprise a Kinko's shop in Spokane, while another location might comprise a supermarket in Kalamazoo.

In addition, the UIDs that are used can comprise any suitable UIDs. In this example, a very simplistic 5-digit number is used. The UID can, however, comprise other identifiers. For example, to ensure uniqueness, the UIDs can comprise a date/time/geography stamp that includes the date and time of issuance, as well as a geographic identifier that is unique for that location. The UIDs can also comprise URLs (Universal Resource Locators).

Each of the depicted locations includes one or more devices or services that are associated with it. The devices or services can comprise any type of device or service that might be desirable for a user to access and use when in a particular location. The term "device" is intended to include, without limitation, hardware devices that may have software components. Examples can include such things as printers, plotters, facsimile machines, copiers, computers, servers and the like. The term "service" is intended to include, without limitation, such things as software services that are associated with a particular location. Software services are typically administered by some type of hardware mechanism such as a server. Thus, both devices and services can have hardware and software aspects.

In this example, Location 1 has three devices associated with it—devices 1, 2, and 3. Location 2 has three devices associated with it—devices 4, 5, and 6. Location 3 has three devices associated with it—devices 7 and 8. Each of these particular devices is registered under the respective UID that is associated with its corresponding location. So, device 1 is registered under UID=00001, and so on. To maintain a listing of locations and associated devices, a device registry can be used. In this particular example, database 106 includes a device registry 108. Notice that, for each UID, the corresponding devices for that location appear thereunder. It is to be appreciated that while the device registry 108 is shown as being maintained by and accessible through server 104, the device registry may be maintained and administered in a distributed fashion (i.e. on and by different computers or servers). These different computers can include, for example, various client devices that might want to take advantage of devices in a particular location. Specifically, some client devices might include or otherwise be provided with a device registry or sub-registry that lists devices associated with particular locations.

One way that various devices can become associated with particular locations is as follows. When a device, such as device 1 for example, is initially located at Location 1, it sends a message containing the UID of the location as well as its own identifier to server 104. Server 104 is programmed to ensure that a registry entry is made in device registry 108. If device 1 should move to another location, it can send a revocation message to the server that can revoke its current registration. When the device arrives at the new location, a new message can be sent to the server identifying the new location so that a new association can be established in the device registry. These messages can be sent by the devices themselves, or by a system administrator. Accordingly, the registration process is quick, convenient and flexible.

Discovery of the location-specific devices is similarly quick and straight forward. Consider, for example, client device 110. Assume that client device 110 is a mobile device such as a laptop computer. Assume now that client device 110 enters Location 1 and the user wishes to discover the devices and services that are available for that location. In this case, either the user or the client device can acquire the UID of the location and can send a message to server 104 requesting a list of the available devices. If the user acquires the UID, they might simply type it into the client device. The client device can acquire the UID in any suitable fashion. For example, it can scan a barcode in the room to acquire the UID. In addition, the UID can be wirelessly transmitted, as by suitable infrared (IR) or radio frequency (RF) devices for receipt by suitably configured client devices. It might also be provided the UID when it establishes a connection with the room. The server, upon receiving the message, can perform a lookup operation on the device registry and return an appropriate list of available devices to the client device. Having acquired knowledge of the available devices, the user and the client device are now ready to interact with any needed devices or services. It will also be appreciated that the client device can, itself, register for its specific location so that other devices can interact with it.

Assume now, in this example, that client device 110 is moved to Location 2 because its user has another meeting. Now, the client device can simply repeat the process described above in order to discover any locally available devices.

In the example described just above, communication between the client device and server computer can take place using any suitable protocols, including wireless protocols.

Exemplary Internet System

Figure 2:
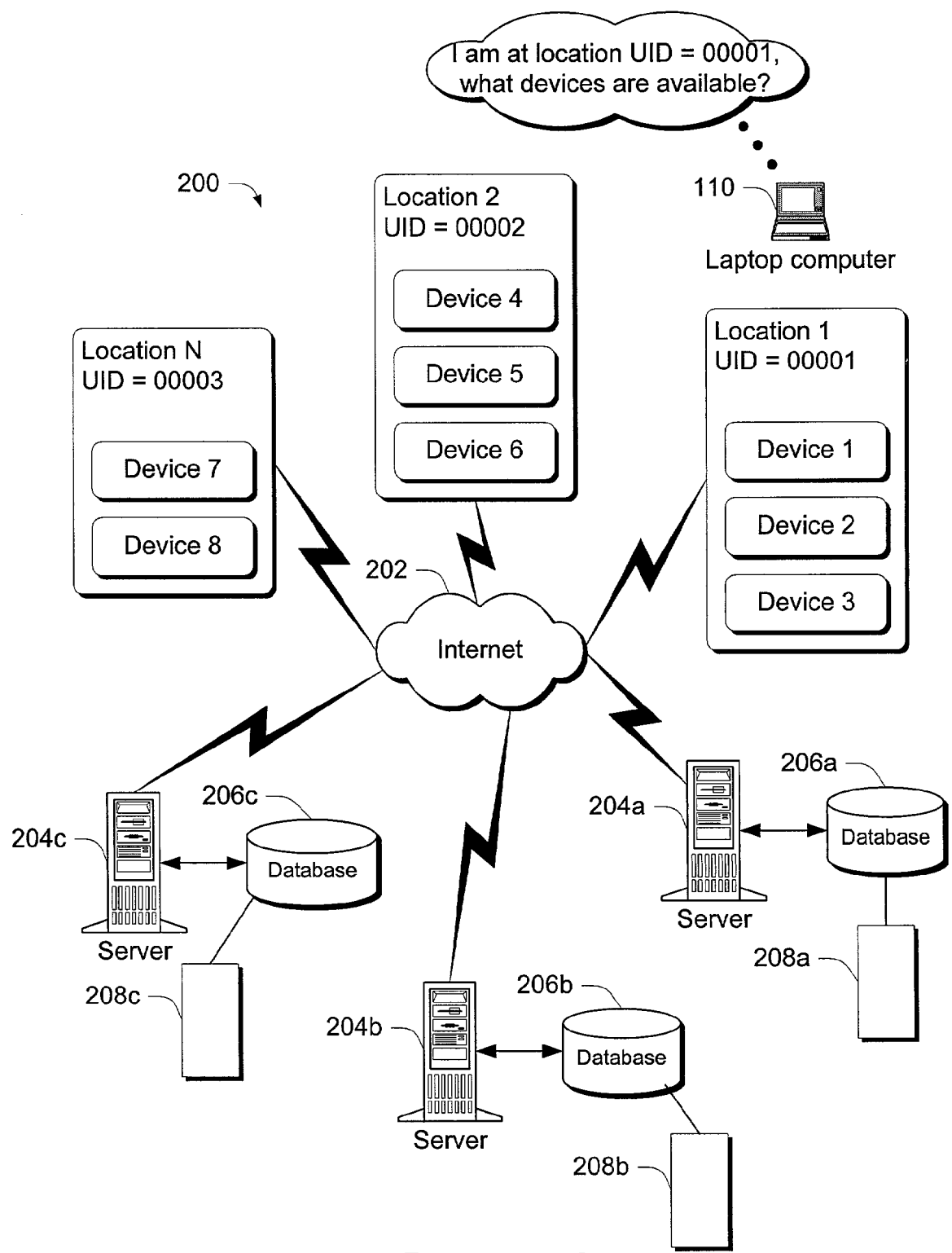
FIG. 2 is an illustration of an exemplary Internet system in which one or more embodiments can be utilized.

FIG. 2 shows an exemplary system 200 that is configured to enable devices to register for their locations so that other devices can discover them. In this example, system 200 includes a network 202 which in this example comprises the Internet. Multiple different servers 204a-204c are provided and each is associated with a database 206a-206c respectively.

A number of different locations are shown and are designated "Location 1", "Location 2", and "Location N". The "Location N" designation is used to indicate that there can be a very large number of locations that comprise system 200. This is especially so given the Internet nature of this particular embodiment. As in the above example, each location includes a unique identifier or UID. In this example, many of the locations will not typically be related to each other. That is, the locations can typically be associated with different entities that can provide different collections of devices and services for discovery.

As in the above example, various devices can become associated with particular locations as follows. When a device is initially located at a particular location, it sends a message containing the UID of the location, as well as its own identifier to one or more of the servers 204a-204c. The servers are programmed to ensure that a registry entry is made in its corresponding device registry. If the device should move to another location, it can send a revocation message to the server that can revoke its current registration. When the device arrives at the new location, a new message can be sent to the server identifying the new location so that a new association can be established in the device registry. These messages can be sent by the devices themselves, or by a system administrator. Accordingly, the registration process is quick, convenient and flexible. Messages can be sent using any suitable protocols. Typical Internet protocols are known and are not described here in additional detail. Having a number of different servers can also provide an opportunity to provide varied services to the client devices. For example, server 204a can be programmed to provide a first bundle of services to any of the locations; and, server 204b can be programmed to provide a second different bundle of services to the locations. These services can, for example, be provided at different levels of granularity. For example, server 204a can be programmed to associate UID=00001 with Conference Room 5 of a particular building in the Chicago office of a particular business, while server 204b can be programmed to associate UID=00001 with the company's Chicago office site. Based on this difference in granularity, different types of services can be provided via different policies. For example, once an individual is located at the Chicago office site, server 204b can permit them to use any black and white printer on the site. Server 204a, however, can permit them to use the expensive color copier located in Conference Room 5.

Discovery of the location-specific devices is similarly quick and straight forward. Consider again, for example, client device 110. Assume that client device 110 is a mobile device such as a laptop computer. Assume now that client device 110 enters Location 1 and the user wishes to discover the devices and services that are available for that location. In this case, either the user or the client device can acquire the UID of the location and can send a message to server 204 requesting a list of the available devices. If the user acquires the UID, they might simply type it into the client device. The client device can acquire the UID in any suitable fashion. For example, it can scan a barcode to acquire the UID. The server, upon receiving the message, can perform a lookup operation on its device registry, and return an appropriate list of available devices to the client device. Having acquired knowledge of the available devices, the user and the client device are now ready to interact with any needed devices. It will also be appreciated that the client device can, itself, register for its specific location so that other devices can interact with it.

Exemplary Method

Figure 3:
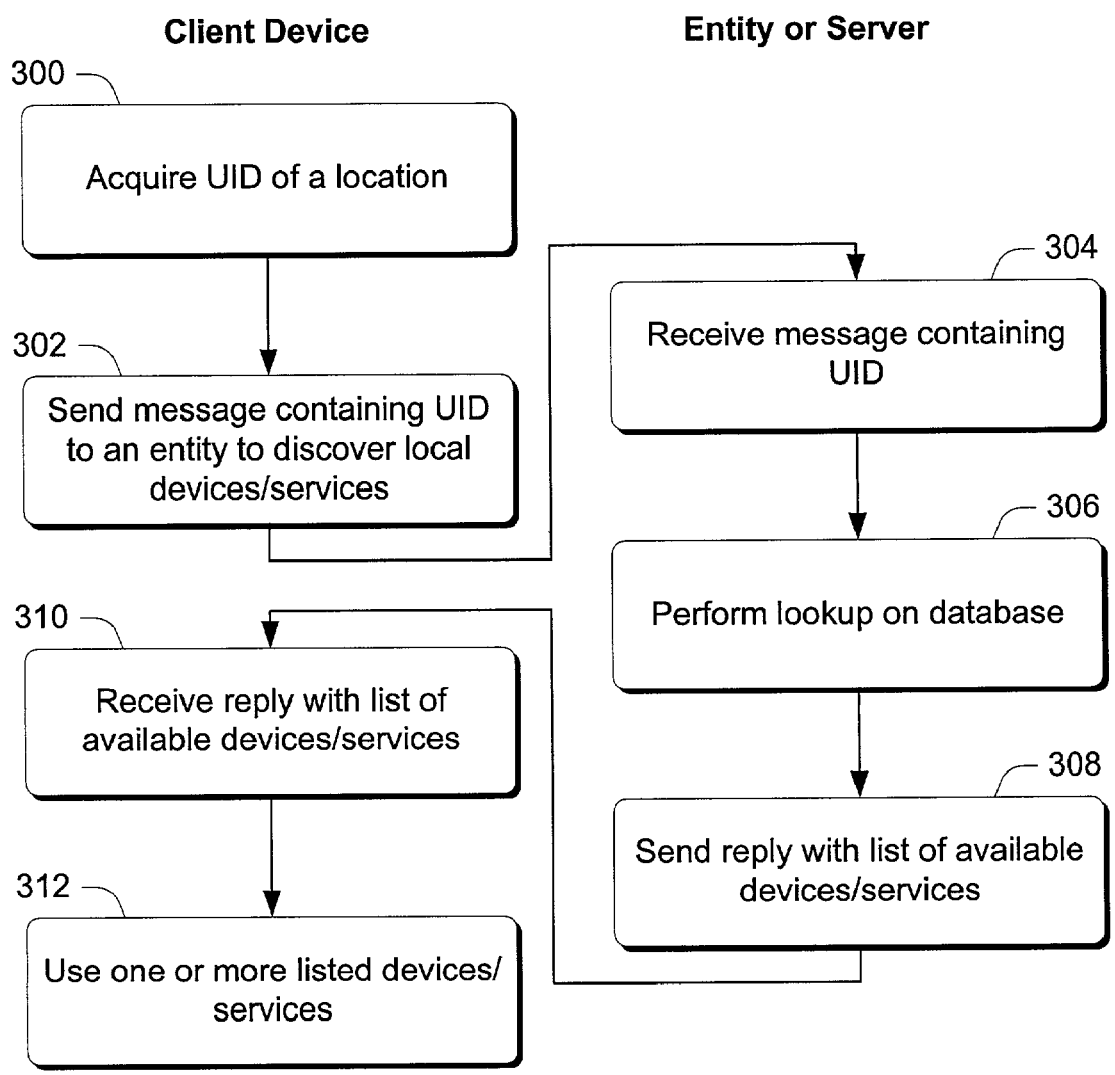
FIG. 3 is a flow diagram that describes steps in a method in accordance with one or more embodiments.

FIG. 3 is a flow diagram of steps in a method in accordance with one embodiment. The steps can be implemented in any suitable hardware, software, firmware or combination thereof. In the illustrated example, the reader will observe that the flow diagram is separated into two portions. The leftmost portion of the flow diagram describes steps that can be implemented by a client device. The rightmost portion of the flow diagram describes steps that can be implemented by an entity or server that maintains or otherwise has access to a registry list of location-specific devices or services.

Step 300 acquires a UID of a particular location. This step can be implemented in response to a client device entering a corresponding location. The UID can be acquired in any suitable way. For example, the UID can be manually entered into the client device. Alternately, the client device can automatically acquire the UID when it enters the location (as by wirelessly receiving the UID or receiving it in some other fashion). Regardless of the way that the UID is acquired, step 302 sends a message containing the UID to an entity in order to discover local devices/services. This step can be implemented using any suitable communication protocols. The message can be sent via hard link, or wirelessly.

Step 304 receives the message containing the UID. This step can be performed by an entity, such as a server computer, that has access to a registry list of available devices for that location. Step 306 performs a lookup on a database that contains such information, and retrieves a list of devices that correspond to a location with which the UID is associated. Step 308 then sends a reply to the client device. The reply includes a list of available devices.

Step 310 receives the reply that includes the list. This step is performed by the client device which now knows of the available devices or services. Step 312 uses one or more listed devices or services.

Exemplary Device

Figure 4:
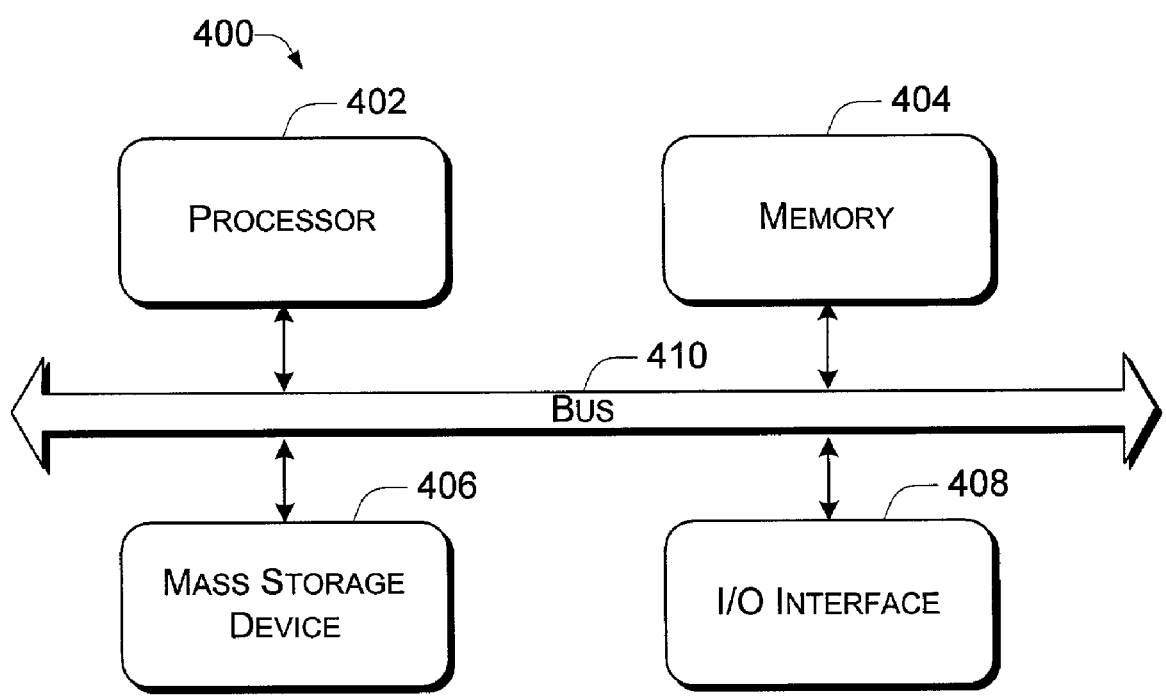
FIG. 4 is a block diagram of a computer system that can be utilized in accordance with one or more embodiments.

FIG. 4 illustrates an exemplary computer system 400 that can be utilized in accordance with the above-described embodiments. Computer system 400 can be, for example, a client device such as laptop computer 110 (FIG. 1), and/or server 104 (FIG. 1). Computer system 400 represents a wide variety of computing devices, such as desktop computers, portable computers, dedicated server computers, multi-processor computing devices, cellular telephones, personal digital assistants (PDAs), handheld or pen-based computers, microcontroller-based electronic devices, gaming consoles, and so forth.

Computer system 400 includes one or more processors 402, memory 404, a mass storage device 406, and an input/output (I/O) interface 408, all coupled to a bus 410. Bus 410 represents one or more buses in computer system 400, such as a system bus, processor bus, accelerated graphics port (AGP), peripheral component interconnect (PCI), and so forth. The bus architecture can vary by computing device as well as by manufacturer. I/O interface 408 is a conventional interface allowing components of system 400 (e.g., processor(s) 402) to communicate with other computing devices via a network, such as network 102 of FIG. 1. I/O interface 408 may be, for example, a modem, a network interface card (NIC), and so forth.

Memory 404 represents volatile and/or nonvolatile memory used to store instructions and data for use by processor 402. Typically, instructions are stored on a mass storage device 406 (or nonvolatile memory) and loaded into a volatile memory 404 for execution by processor(s) 402. Additional memory components may also be involved, such as cache memories internal or external to processor 402.

Various embodiments can be implemented, at different times, in any of a variety of computer readable media that is part of, or readable by, system 400. For example, such computer readable media may be mass storage device 406, memory 404 or a cache memory, a removable disk (not shown) that is accessible by processor 402 or another controller of system 400 (such as a magnetic disk or optical disk), and so forth.

Computer system 400 is exemplary only. It is to be appreciated that additional components (not shown) can be included in system 400 and some components illustrated in system 400 need not be included. For example, a display adapter, additional processors or storage devices, additional I/O interfaces, and so forth may be included in system 400, or mass storage device 406 may not be included.

I/O interface 408 is a conventional interface allowing components of system 400 (e.g., processor 402) to communicate with other computing devices via a network, such as network 102 of FIG. 1.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

CONCLUSION

The methods and systems described above enable devices to discover each other when the devices are in a common location. The approaches are convenient, flexible and adaptable and, hence, promote discovery of local devices in a manner that greatly facilitates their use and exploitation by a user and/or client device.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A method of discovering local devices or services comprising:

associating at least one unique identifier with at least one location, said at least one unique identifier including a first unique identifier;

associating one or more devices including a first device with said first unique identifier based upon said first unique identifier acquired by said first device at a location associated with said first unique identifier;

providing an indication of a plurality of devices and services that are associated with said first unique identifier, such that a second device associated with said first unique identifier is made aware of other devices including said first device that are available for use and are associated with said first unique identifier, said second device acquiring said first unique identifier at said location associated with said first unique identifier, wherein said providing comprises:

receiving a message containing at least one unique identifier;

ascertaining said one or more devices or services based upon said at least one unique identifier; and replying to a sender of the message with a list of available devices or services for a location corresponding to said at least one unique identifier.

2. The method of claim 1, wherein associating said one or more devices comprise associating multiple devices with said at least one unique identifier.

3. The method of claim 2, said associating multiple devices with said at least one unique identifier comprises associating multiple different devices with said at least one unique identifier.

4. The method of claim 1, wherein said acts of receiving and replying are accomplished via a network.

5. The method of claim 1, wherein said acts of receiving and replying are accomplished via the Internet.

6. One or more computer-readable media having computer-readable instructions thereon which, when executed by one or more processors, cause the one or more processors to:
associate at least one unique identifier with at least one location, the at least one unique identifier including a first unique identifier;
associate a plurality of devices including a first device and a second device with said first unique identifier acquired by the plurality of devices at a location associated with the first unique identifier; and
provide an indication of a plurality of devices including the first device and services that are associated with said first unique identifier by:
receiving a message containing the first unique identifier from the second device;
ascertaining said one or more devices currently available for use to a sender of the message based upon said first unique identifier; and
replying to the sender of the message with a list of available devices including the first device for a location corresponding to said first unique identifier.

7. A server embodying the one or more computer-readable media of claim 6.

8. A method of discovering local devices or services comprising:
associating multiple unique identifiers including a first unique location with multiple related locations, each related location having a unique identifier;
receiving a report that a first client device has acquired a first unique identifier corresponding to particular location, the first client device being located at the particular location;
associating one or more devices including a second device with one or more of the unique identifiers based on reports received from said one or more devices regarding acquisition of said one or more of the unique identifiers, the second device being accessible from the particular location that corresponds to the first unique identifier;
receiving a message from the first client device that contains a unique identifier of one or more of the locations including the first unique identifier;
ascertaining from said unique identifier any devices that are associated with a location that corresponds to said unique identifier; and
replying to said first client device with a list of available devices including the second device for the location, wherein said available devices on the list reported acquisition of said unique identifier.

9. The method of claim 8, wherein said acts of receiving and replying are accomplished via a network.

10. The method of claim 8, wherein said acts of receiving and replying are accomplished via the Internet.

* * * * *